Figure 1:
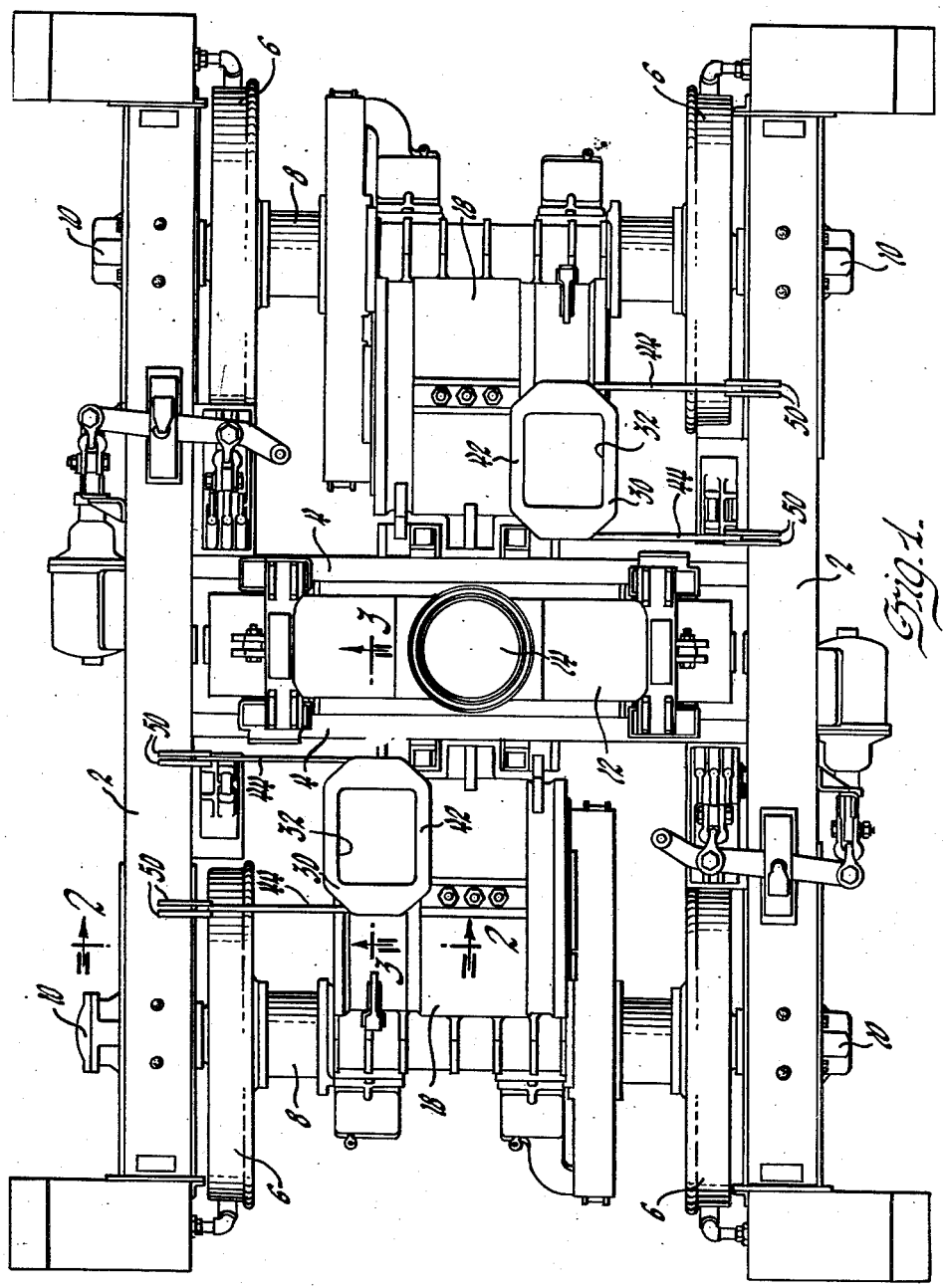

Aug. 21, 1956 L. D. BRITTON ET AL 2,759,431
COOLING DUCT ARRANGEMENT
Filed Dec. 14, 1954 2 Sheets-Sheet 1

INVENTORS
Loren D. Britton &
BY Joseph P. Miller
S. C. Thorpe
ATTORNEY

Aug. 21, 1956

L. D. BRITTON ET AL 2,759,431

COOLING DUCT ARRANGEMENT

Filed Dec. 14, 1954

2 Sheets-Sheet 2

INVENTORS
Loren D. Britton &
BY Joseph P. Miller
J. C. Thorpe
ATTORNEY ns Office 2,759,431
Patented Aug. 21, 1956

2,759,431
COOLING DUCT ARRANGEMENT

Loren D. Britton, La Grange, and Joseph P. Miller, Hinsdale, Ill., assignors to General Motors Corporation, Detroit, Mich., a corporation of Delaware Application December 14, 1954, Serial No. 475,228

4 Claims. (Cl. 105—59)

This invention relates generally to cooling means and more particularly to cooling means for the electric traction motors of electrically driven vehicles.

In vehicles, as for example locomotives, which are driven by electrical traction motors supported below the main part of the vehicle such that the body must move relative thereto intermediate coolant conducting means are normally provided to conduct cooling media from the body of the vehicle to the traction motor. While in the past coolant conducting constructions have been provided for conducting cooling air from the locomotive body to the traction motor housing, these past constructions have proven inadequate for several reasons but partly because there is insufficient room to properly mount them either on the traction motor housing or the lower side of the locomotive body. Furthermore, in many air duct applications designed for conducting cooling media from the underside of the locomotive body to the traction motor housing supported on a locomotive truck, the upper portion of the duct is fastened rigidly to the locomotive underframe and the lower portion is hinged to arms which in turn are fastened to the underframe. In this type of construction the traction motor opening moves across the bottom of the air duct as the truck rotates about the bolster center plate so that when the longitudinal centerline of the truck is at a large angle with the locomotive centerline the traction motor housing opening will be exposed thus allowing dirt, dust and other foreign particles to enter the opening. In other prior air duct applications the air duct has been bolted directly to the traction motor housing. This, however, has the disadvantage of requiring the removal of the air duct before the traction motor may be removed for maintenance and repair purposes. Also, in previous applications of cooling ducts to locomotives coil springs have been used on either side thereof to expand the ducts. However, when coil springs of any suitable length are used it is usually also necessary to apply coil spring guides or similar devices which further complicate the cooling duct design.

It is therefore proposed as an object of the present invention to provide a cooling duct arrangement which will maintain the duct opening in the traction motor housing closed or covered at all times regardless of the angular movement between the locomotive body and the locomotive truck, but which is quickly and easily removed for expeditious maintenance and repair of the traction motor and housing.

It is proposed as a further object of this invention to provide a cooling duct arrangement wherein the duct is pivotally supported by the truck frame and the opposite ends of the duct are resiliently maintained apart by unique torsion springs which eliminate the necessity for spring guides.

It is still another object of this invention to provide a unique cooling duct arrangement which movably secures the duct to the truck frame and has means provided on the lower end of the duct to prevent any planar movement thereof relative to the opening in the traction motor housing.

For a fuller understanding of these and other objects of this invention reference may be had to the accompanying detailed description and drawings, in which:

Fig. 1 is a plan view of a typical locomotive truck having the novel cooling duct arrangement superimposed thereon.

Figure 2:
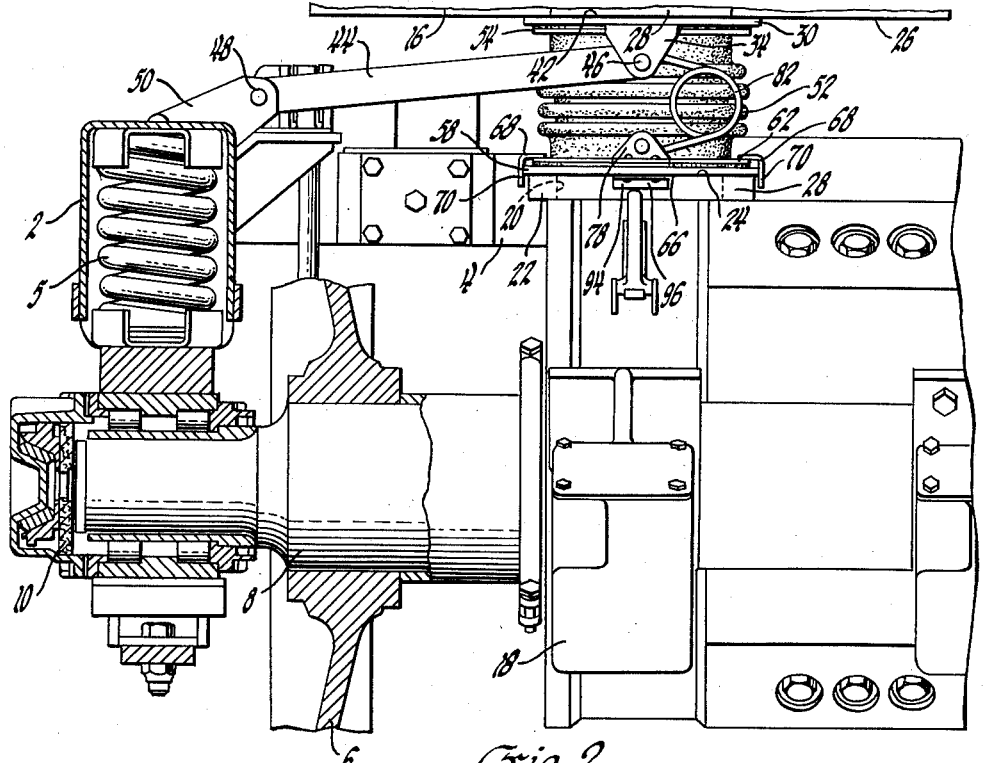

Fig. 2 is an end view in elevation of the truck taken on the line 2—2 of Fig. 1 with parts broken away and in section showing the new cooling duct and serving to illustrate the torsion springs acting between the upper and lower ends of the duct and also how the duct is movably supported on the frame by a pair of pivoted arms. Fig. 2 also illustrates means for preventing the lower end of the duct from moving relative to the opening in the traction motor housing and yet enabling the lower end of the duct to be quickly removed from the traction motor housing in order to expedite maintenance and repair of the motor contained in the housing.

Figure 3:
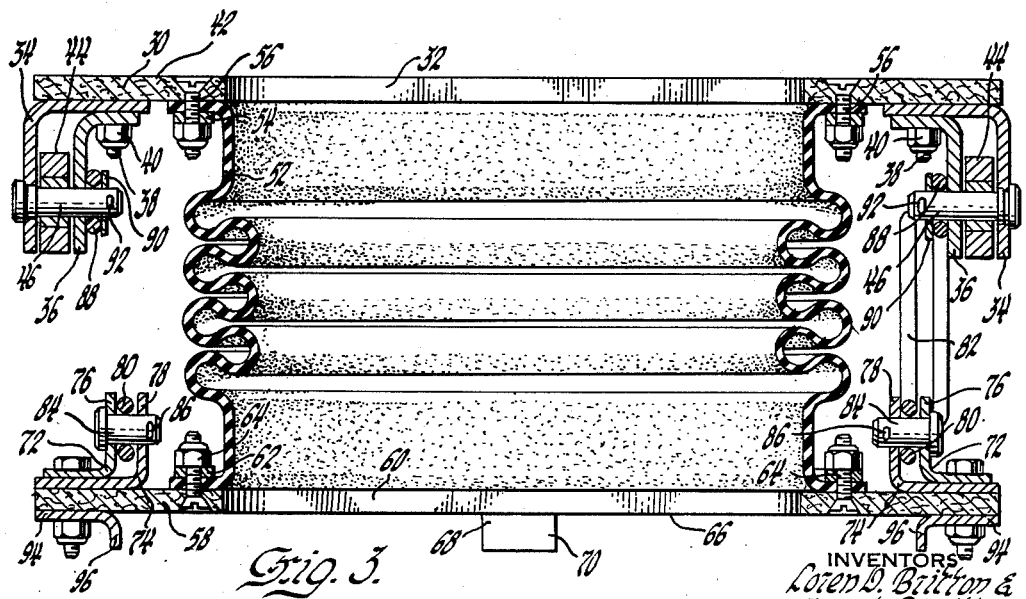

Fig. 3 is a sectional view in elevation taken on the line 3—3 of Fig. 1 and serves to illustrate in more detail the new cooling duct assembly.

Referring now to Figs. 1 and 2, the locomotive truck comprises the usual frame including the longitudinally extending side frame members 2 maintained in spaced parallel arrangement by means of transversely extending transom members 4. The ends of the longitudinal side frames 2 are resiliently mounted on springs 5 supported by journal boxes 10 journaling for rotation the ends of axles 8 to which wheels 6 are secured for rotation therewith. Resiliently supported on the truck frame between the longitudinal side frames 2 and the transom members 4 is a transversely extending bolster 12. The bolster 12 is provided with a depressed center bearing support 14 which receives a downwardly depending center bearing provided on the underside of the locomotive body, indicated in Fig. 2 by a reference character 16. Extending between the transom members 4 and the axles 8 and supported thereon for relative vertical movement relative to the truck frame are a pair of traction motor housings 18 which are provided with a cooling duct opening 20 defined by a collar or flanged member 22 having an upwardly facing surface 24. The underside of the locomotive body 16 is provided with a downwardly facing surface 26 defining an opening 28 therein which is in substantial alignment with the opening 20 in the traction motor housing when the longitudinal centerlines of the locomotive body and truck coincide.

The new conducting means which has been provided to conduct cooling media from the opening 28 in the underside of the locomotive body to the opening 20 in the upper part of the traction motor housing 18 is shown in detail in Figs. 2 and 3 and comprises an upper plate 30 having an aperture 32 therein. The upper plate 30 which preferably is made of some phenolic material to reduce noise and lessen the wear of the surface surrounding opening 28 is provided with angular tabs or ears 34 and 36 on the underside adjacent opposite edges thereof. Each spaced set of ears or tabs 34—36 is secured to the underside of plate 30 by means of bolts 38 and nuts 40. The heads of the bolts 38 are countersunk in the upper surface of plate 30 so as to maintain a smooth upwardly facing surface 42. Interposed between the sets of downwardly depending tabs 34—36 are parallel arms 44 pivotally attached therebetween by means of pins 46. The opposite ends of the levers or arms 44 are pivotally attached by means of pins 48 to lugs 50 welded or otherwise rigidly secured to a side frame 2. As best seen in Fig. 3, a flexible rubber duct 52 is clamped to the underside of the plate 30 around the periphery of the opening 32 by means of a clamping ring 54 secured to plate 30 by the bolt and nut assemblies 56, the heads of which are countersunk to maintain the smooth upper surface 42. The lower end of the flexible duct 52 is clamped to the upper surface of a lower plate 58 about the periphery of an aperture 60 provided therein by means of a second clamping ring 62 and bolt and nut assemblies 64 whose heads also are countersunk so as to maintain a smooth under or lower surface 66 on plate 58. Plate 58 also is preferably made of some phenolic material to reduce noise and lessen wear of the upper surface of flanged member 22. Secured adjacent the outer edges of the plate 58 are a pair of oppositely disposed angular members 68 having downwardly depending legs 70 which are adapted to fit over the collar member 22 and prevent any substantial movement of plate 58 in the plane of the surface 24 on the upper side of the collar 22. Bolted to the upper side of the plate 58 adjacent opposite edges thereof are sets of angular members 72 and 74 having upwardly extending legs 76 and 78 spaced apart for the reception of the looped end 80 of a torsion spring 82. The looped end 80 is maintained between the legs 76—78 by means of a pin 84 extending through the legs 76—78 and the looped end 80 and a suitable cotter key or pin 86. The opposite end 88 of the torsion spring is also looped and is secured to the upper plate 30 by means of the aforementioned pin 46 extending through the looped end 88 and through a washer 90, the pin being maintained in place by means of a suitable cotter key or pin 92. Also secured to opposite edges of the lower plate 60 on the underside thereof are a pair of angular members 94 having downwardly depending legs 96 which also abut the sides of the collar member 22 and aid in preventing any substantial movement of the lower surface 66 of the plate 58 in the plane of the upwardly facing surface 24 defining the opening in the traction motor housing 18.

From the foregoing description it will be appreciated that the lower end of the cooling duct assembly is prevented from any planar movement relative to the opening of the traction motor housing and that the upper and lower ends of the cooling duct assembly are maintained apart by means of the unique torsion springs without the necessity for any spring guides. The assembly is retained between the openings 20 and 28 in the traction motor housing and the underside of the locomotive body respectively by the pivoted arms 44 which allow relative vertical, angular and rolling movement of the vehicle body relative to the truck. With this construction the only possibility of dirt entering into the traction motor housing is if sufficient angular movement takes place between the locomotive body and the locomotive truck so that the opening 28 in the underside of the locomotive body would become partially uncovered. In such an instance, however, any dirt entering would have to enter against the force of gravity and against the air pressure which forces the cooling air through the opening 28.

Also, it should be emphasized that if it is necessary to remove a traction motor and housing for reasons of maintenance and repair it is only necessary to first lift the cooling duct and pivot it by means of arms 44 out of the way without the need for laboriously undoing various types of fastening means, etc.

It should also be pointed out that the torsion springs eliminate the need formerly required in the use of coil springs to maintain the upper and lower ends of the cooling duct assembly apart thereby substantially simplifying the assembly.

We claim:

1. In a locomotive, a locomotive truck frame having supporting wheels rotatably attached thereto, a traction motor housing supported on said frame, a locomotive body supported by said frame, a surface defining the terminus of a cooling passage in said locomotive body, a surface defining an opening in said traction motor housing, and cooling media conducting means supported by said frame between said terminus and said opening comprising a flexible duct, rigid apertured surfaces on the ends of said duct, an arm pivotally supported on said frame and pivotally attached to one of said rigid apertured surfaces, and a pair of torsionally acting springs having their ends connected to said apertured surfaces opposite each other and resiliently maintaining said apertured surfaces apart and in respective engagement with the surface defining said terminus and the surface defining said opening.

2. In a locomotive, a locomotive truck frame having supporting wheels rotatably attached thereto, a traction motor housing supported on said frame, a locomotive body movably supported on said frame, a first surface having an opening therein which represents the terminus of a cooling passage in said locomotive body, a second surface having an opening therein communicating with the interior of said traction motor housing, a collapsible conduit having rigid apertured surfaces on the ends thereof, an arm pivotally secured at one end thereof to one of said apertured surfaces so as to maintain the axis of pivotal connection in a substantially horizontal plane, the opposite end of said arm being pivotally secured to said frame for movement in a vertical plane only so as to locate said conduit and apertured surfaces between said first and second surfaces, and a torsion spring having the ends thereof connected to said apertured surfaces to resiliently maintain said apertured surfaces apart and in respective engagement with said first and second surfaces.

3. A cooling arrangement for the traction motor of a locomotive including a truck frame having supporting wheels rotatably attached thereto and a traction motor housing and a locomotive body supported by said frame, comprising a first surface defining the terminus of a cooling passage in said locomotive body, a second surface defining an opening in said traction motor housing, and cooling media conducting means supported by said frame between said terminus and said opening comprising a collapsible conduit having rigid apertured surfaces on the ends thereof, a pair of parallelly acting arms pivotally secured at one end thereof to one of said apertured surfaces, the opposite ends of said arms being pivotally secured to said frame so as to maintain said conduit and apertured surfaces between said first and second surfaces and to allow limited movement of the one of said apertured surfaces relative to said frame, a pair of torsion springs on opposite sides of said cooling media conducting means having the ends thereof connected to said apertured surfaces to resiliently maintain said apertured surfaces apart and in respective engagement with said first and second surfaces.

4. In a locomotive, a locomotive truck frame having supporting wheels rotatably attached thereto, a traction motor housing supported on said frame, a locomotive body movably supported by said frame, a downwardly facing surface defining the terminus of a cooling passage in said locomotive body, a surface including an upwardly facing flange defining an opening in said traction motor housing, and cooling media conducting means supported by said frame between said terminus and said opening comprising a vertically extending flexible duct, upper and lower rigid apertured surfaces on the ends of said duct, a pair of arms pivotally connected between said frame and the upper of said rigid apertured surfaces, a torsionally acting spring having the ends thereof connected to said apertured surfaces and resiliently maintaining said apertured surfaces apart and in respective engagement with the surface defining said terminus and the surface including said flange, and oppositely disposed depending shoulders on the apertured surface in engagement with the surface defining said opening, said shoulders engaging opposite sides of said flange to prevent movement of the last-mentioned of said apertured surfaces in the plane of the surface including said flange.

References Cited in the file of this patent

UNITED STATES PATENTS

| | | |
|---|---|---|
| 1,795,266 | Smith | Mar. 3, 1931 |
| 2,154,771 | Piron | Apr. 18, 1939 |
| 2,230,580 | Adams et al. | Feb. 4, 1941 |